United States Patent
Yang et al.

(10) Patent No.: US 9,970,604 B2
(45) Date of Patent: May 15, 2018

(54) LIGHTING DEVICE

(71) Applicant: LG INNOTEK CO., LTD., Seoul (KR)

(72) Inventors: Hyun Duck Yang, Seoul (KR); Moo Ryong Park, Seoul (KR); Kwang Ho Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 627 days.

(21) Appl. No.: 14/383,394

(22) PCT Filed: Mar. 5, 2013

(86) PCT No.: PCT/KR2013/001759
§ 371 (c)(1),
(2) Date: Sep. 5, 2014

(87) PCT Pub. No.: WO2013/133603
PCT Pub. Date: Sep. 12, 2013

(65) Prior Publication Data
US 2015/0036336 A1 Feb. 5, 2015

(30) Foreign Application Priority Data

Mar. 8, 2012 (KR) .................. 10-2012-0023757

(51) Int. Cl.
*F21V 1/00* (2006.01)
*F21K 99/00* (2016.01)
(Continued)

(52) U.S. Cl.
CPC .................. *F21K 9/50* (2013.01); *F21K 9/60* (2016.08); *G02B 6/0016* (2013.01);
(Continued)

(58) Field of Classification Search
CPC .......... F21K 9/50; F21K 9/60; G02B 6/0016; G02B 6/0021; G02B 6/0041; G02B 6/0051; G02B 6/0053
(Continued)

(56) References Cited

U.S. PATENT DOCUMENTS 6,456,436 B2 * 9/2002 Miura .................. G02B 3/0068
349/61
7,408,708 B2 * 8/2008 Goto ..................... G02B 3/0031
359/453
(Continued)

FOREIGN PATENT DOCUMENTS

KR 10-2008-0094989 A 10/2008
KR 10-2009-0054331 A 5/2009
(Continued)

OTHER PUBLICATIONS

Machine translation for KP 20120003273.*
(Continued)

*Primary Examiner* — Tsion Tumebo
(74) *Attorney, Agent, or Firm* — KED & Associates, LLP

(57) ABSTRACT

Provided is a lighting device, including: one or more light emitting units formed on a printed circuit board; a resin layer which is formed on the light emitting units so that the light emitting units are embedded in the resin layer; and a diffusion member formed on an upper side of the resin layer, wherein a protruding optical pattern is formed on at least one of an upper side of the printed circuit board and a lower surface of the diffusion member, whereby various geometric optical patterns can be implemented, an entire thickness can be reduced and when a product is designed, a degree of freedom in design can be improved according to the securing of flexibility.

17 Claims, 4 Drawing Sheets

(51) Int. Cl.
*F21V 8/00* (2006.01)
*F21K 9/60* (2016.01)

(52) U.S. Cl.
CPC .......... *G02B 6/0021* (2013.01); *G02B 6/0041* (2013.01); *G02B 6/0051* (2013.01); *G02B 6/0053* (2013.01)

(58) Field of Classification Search
USPC ....................................................... 362/235
See application file for complete search history.

(56) References Cited

U.S. PATENT DOCUMENTS

| | | | | |
|---|---|---|---|---|
| 7,806,539 | B2* | 10/2010 | Parker | F21V 5/00 |
| | | | | 362/19 |
| 8,113,703 | B2* | 2/2012 | Salters | G02B 6/0068 |
| | | | | 362/231 |
| 2008/0037284 | A1 | 2/2008 | Rudisill | |
| 2008/0064131 | A1* | 3/2008 | Chang | G02F 1/133603 |
| | | | | 438/29 |
| 2010/0165241 | A1* | 7/2010 | Kim | G02B 6/0053 |
| | | | | 349/61 |
| 2011/0051412 | A1* | 3/2011 | Jeong | G02F 1/133603 |
| | | | | 362/235 |
| 2011/0149198 | A1* | 6/2011 | Kim | G02F 1/133308 |
| | | | | 349/58 |
| 2011/0242796 | A1* | 10/2011 | Yang | C09J 11/02 |
| | | | | 362/97.1 |
| 2012/0013811 | A1 | 1/2012 | Shimizu | |

FOREIGN PATENT DOCUMENTS

| | | |
|---|---|---|
| KR | 10-2010-0073147 A | 7/2010 |
| KR | 10-2012-0003271 A | 1/2012 |
| KR | 10-2012-0003272 A | 1/2012 |
| KR | 10-2012-0003273 A | 1/2012 |
| KR | 10-2012-0003277 A | 1/2012 |
| KR | 10-2012-0004222 A | 1/2012 |
| KR | 10-1148119 B1 | 5/2012 |
| KR | 10-1168403 B1 | 7/2012 |
| KR | 10-1168404 B1 | 7/2012 |
| KR | 10-1379924 B1 | 4/2014 |

OTHER PUBLICATIONS

European Search Report dated Jul. 13, 2015 issued in Application No. 13757514.8.
International Search Report dated Jun. 28, 2013 issued in Application No. PCT/KR2013/001759.
Chinese Office Action issued in Application 201380019367.1 dated Mar. 9, 2017 (full Chinese text and full English translation).
Summons to attend oral proceedings pursuant to Rule 115(1) EPC issued in Application 13757514.8 dated Nov. 3, 2017.

* cited by examiner

[Fig. 1] PRIOR ART
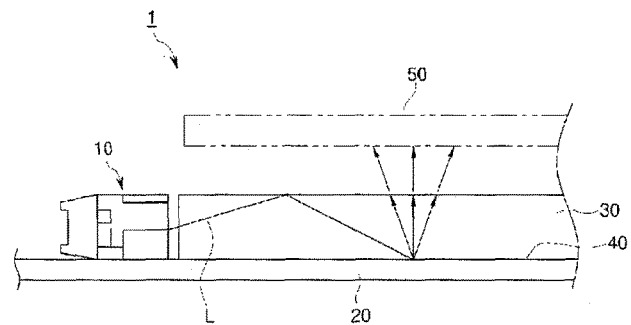
[Fig. 2] PRIOR ART
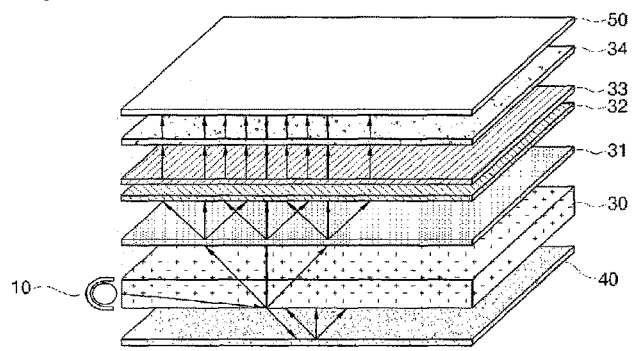
[Fig. 3]
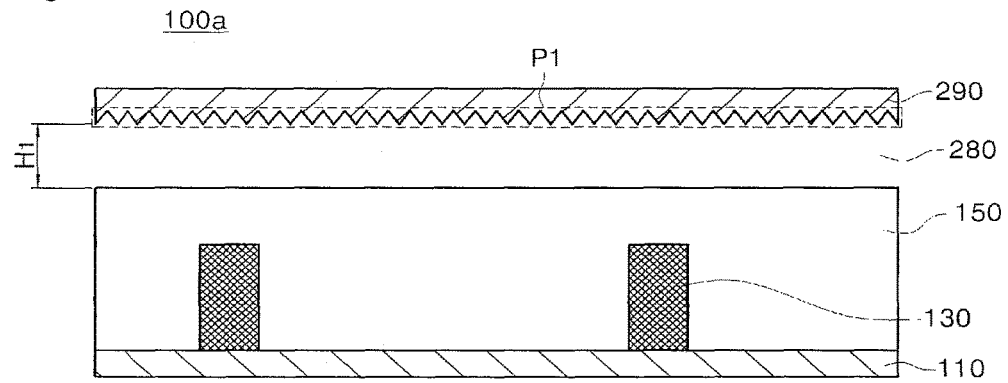
[Fig. 4]
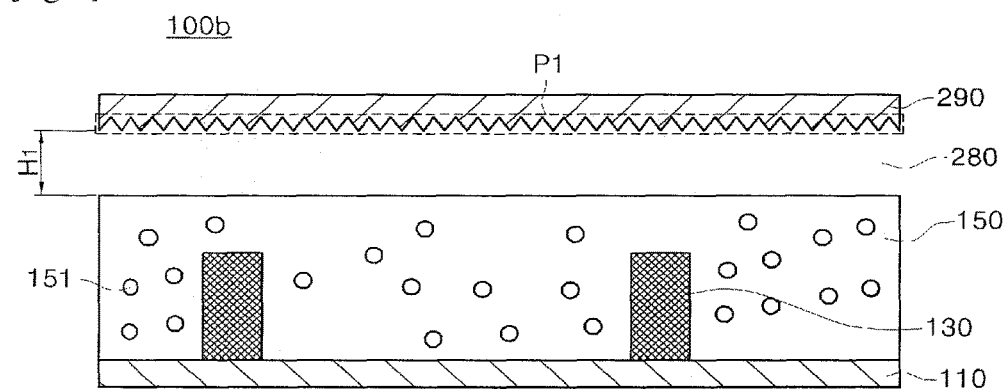

[Fig. 5]
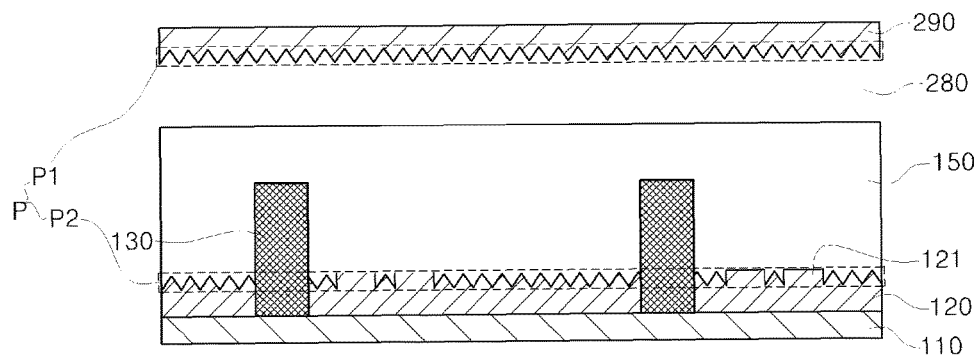
[Fig. 6]
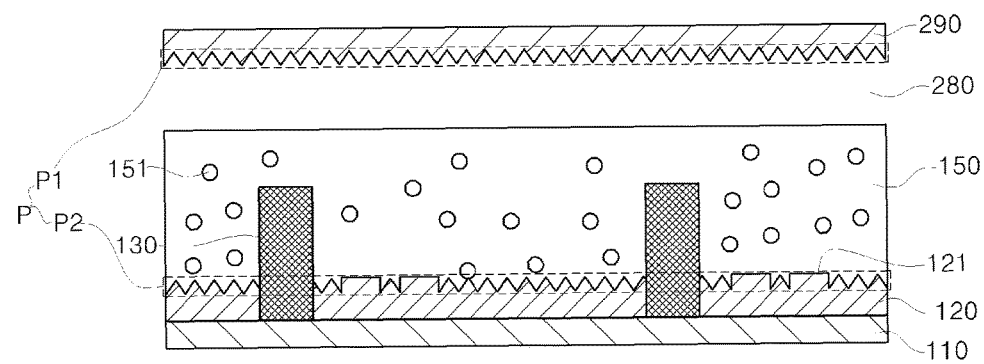
[Fig. 7]
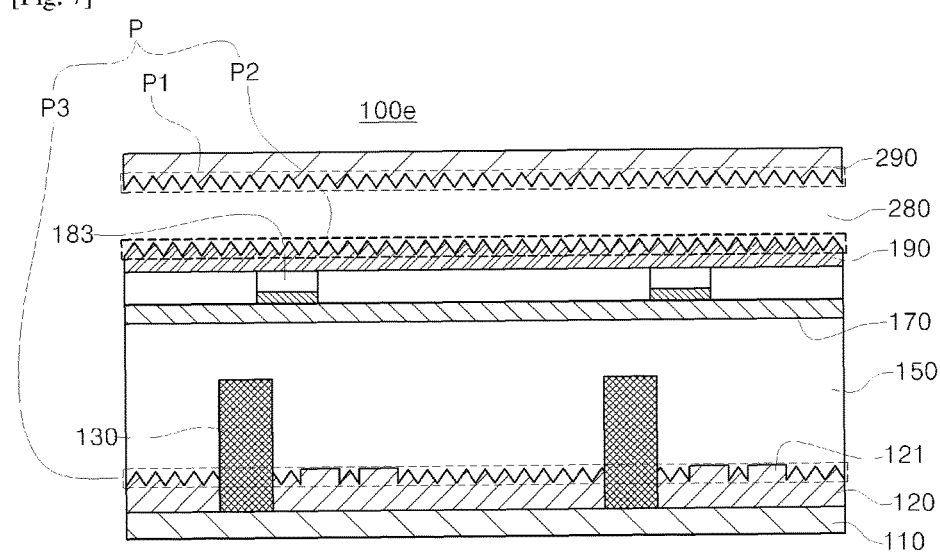

[Fig. 8]
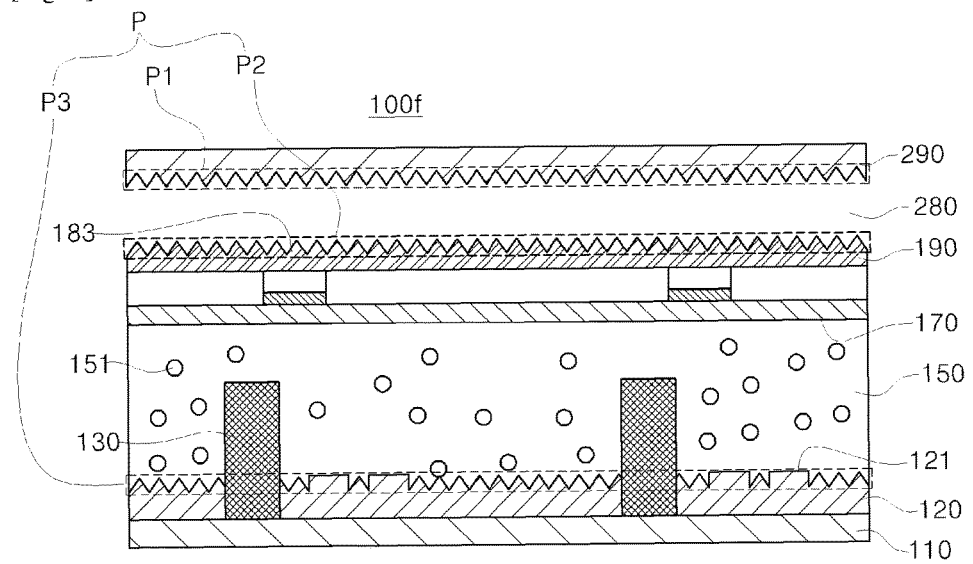
[Fig. 9]
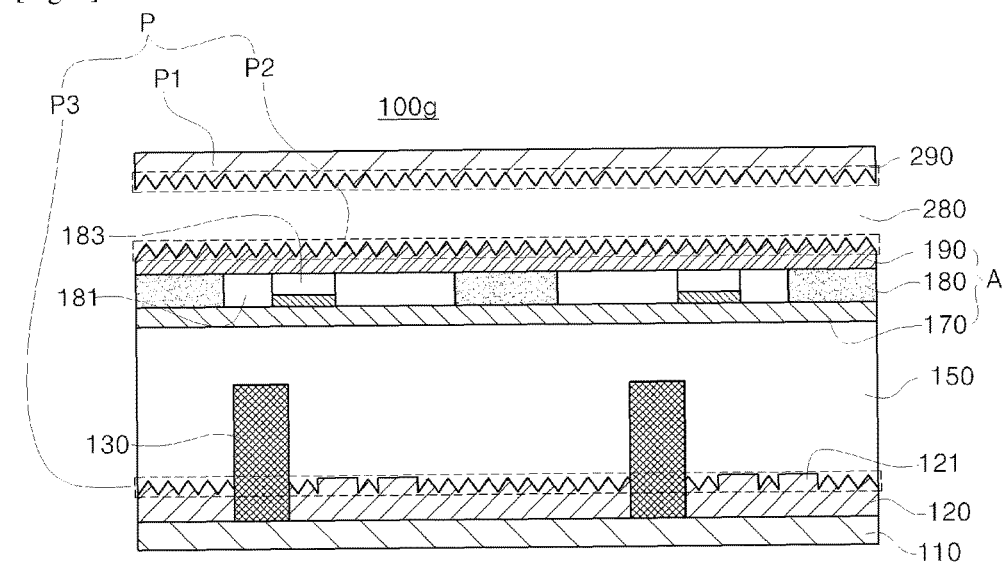

[Fig. 10]
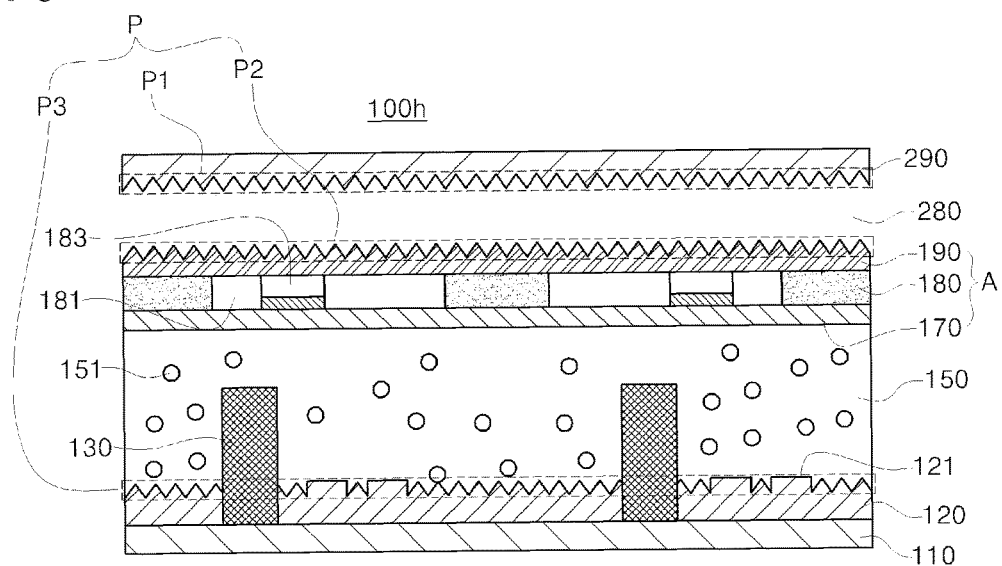

LIGHTING DEVICE

CROSS-REFERENCE TO RELATED PATENT APPLICATIONS

This application is a U.S. National Stage Application under 35 U.S.C. 5371 of PCT Application No. PCT/KR2013/001759, filed Mar. 5, 2013, which claims priority to Korean Patent Application No. 10-2012-0023757, filed Mar. 8, 2012, whose entire disclosures are hereby incorporated by reference.

TECHNICAL FIELD

The present invention relates to a technical field of a lighting device, and more specifically, to a structure of a lighting device which enables an entire thickness to get thinner and is able to secure light efficiency and embody various optical patterns by removing a light guide plate.

BACKGROUND ART

An LED (Light Emitted Diode) device is a device which converts an electrical signal to infrared rays or light using a composition semiconductor property. Unlike a florescent lamp, since the LED device does not use harmful substances such as mercury and the like, it has a low possibility to cause environmental pollution and a long life span compared to a conventional light source. Also, it is advantageous that the LED device spends low electricity compared to the conventional light source and has excellent visibility and low brilliantness due to a high color temperature.

Accordingly, a current lighting device has been developed from a structure, in which a traditional light source such as a conventional incandescent lamp or a florescent lamp is used, to a structure, in which the aforesaid LED device is used as a light source. In particular, by using a light guide plate as disclosed in Korean Laid-Open Patent Publication No. 10-2012-0009209, the lighting device which performs a surface light-emitting function has been provided.

FIG. 1 and FIG. 2 schematically illustrate a conventional lighting device 1 which performs a surface light-emitting function. Referring to FIG. 1 and FIG. 2, the conventional lighting device 1 is configured such that a flat light guide plate 30 is disposed on a substrate 20, and a plurality of side view type LEDs 10 (only one LED being illustrated in the drawings) are disposed on a side of the light guide plate 30 in an array shape.

Light (L) incident to the light guide plate 30 from the LEDs 10 is reflected to an upper part by a minute reflection pattern or a reflection sheet 40 which is provided onto a bottom surface of the light guide plate 30 and is emitted from the light guide plate 30. Then, the light is emitted to the upper part of the light guide plate 30 and thus is provided to the outside through an external housing 50 made of a transparent material. Like the conceptual view as illustrated in FIG. 2, the lighting device 1 may be configured such that a plurality of optical sheets such as a diffusion sheet 31, prism sheets 32, 33, a protective sheet 34 and the like are further added between the light guide plate 30 and the external housing 50.

The aforesaid lighting device 1 functions to uniformly supply the light to the outside. The light guide plate 30 is a component which functions to improve luminance of the light device 1 and to uniformly supply the light. Also it is a kind of plastic mold lens to uniformly transmit the light emitted from the light source (i.e. the LEDs). Accordingly, the light guide plate 30 is elementally used as an essential component of the conventional lighting device 1, but, due to a thickness of the light guide plate 30 itself, there is a limitation to make the thickness of an entire product thin. Furthermore, as a material of the light guide plate 30 is not flexible, it is disadvantageous that it would be difficult to apply the light guide plate to the external housing 50 in which a bend is formed, and thus a product plan and design cannot be easily changed.

PRIOR ART REFERENCE

Patent Reference

Korean Laid-Open Patent Publication No. 10-2012-0009209

DISCLOSURE OF INVENTION

Technical Problem

The present invention has been made keeping in mind the above problems occurring in the related art. An aspect of the present invention provides a structure of a lighting device, which is configured such that a resin layer instead of a light guide plate is used to guide light emitted from light emitting units to the outside, thereby enabling an entire thickness of the lighting device to get thinner.

Another aspect of the present invention provides a structure of a lighting device, which can secure reliability while improving a degree of freedom in product design as the lighting device itself of an upper part of a printed circuit board or a lower part of a diffusion member has flexibility.

Still another aspect of the present invention provides a lighting device which enables a geometric optical pattern to be implemented by additionally forming a protruding optical pattern at an upper side of a printed circuit board or a lower side of the diffusion member.

Solution to Problem

According to an aspect of the present invention, there is provided a lighting device including: one or more light emitting units formed on a printed circuit board; a resin layer which is formed on the light emitting units so that the light emitting units are embedded in the resin layer; and a diffusion member formed on an upper side of the resin layer, wherein a protruding optical pattern is formed on any one of an upper side of the printed circuit board and a lower surface of the diffusion member.

Advantageous Effects of Invention

According to the present invention, it is advantageous that the number of light emitting units can be reduced and an entire thickness of the lighting device can be thinner by removing the light guide plate and guiding light using the resin layer.

According to the present invention, as the lighting device is formed using the flexible printed circuit board and the resin layer, flexibility can be secured and a degree of freedom in product design can be improved.

Also, according to the present invention, it is advantageous that the lighting device, which enables the geometric optical pattern to be implemented by further forming the protruding optical pattern at the upper side of the printed circuit board or at the lower side of the diffusion member, can be provided. Furthermore, the light lighting having improved aesthetic sensibility can be provided and can be applied to various kinds of lighting devices.

Moreover, according to the present invention, it is advantageous that the reflectance of light can be improved, the improvement of luminance can be maximized, and a uniform surface light source can be provided because the reflection member and the reflection pattern, which are structures capable of efficiently reflecting the light emitted from the light emitting units, are provided.

Also, according to the present invention, because a first optical substrate or a second optical substrate having the optical pattern is formed such that a spacing part is provided in the adhesive layer, a hot spot and a dark space can be prevented from being generated from the light shielding pattern, and the reliability of components adhered to the adhesive layer can be secured. Also, it is advantageous that the lighting device without a significant difference between optical properties can be realized, and it would be possible to accurately align the components.

BRIEF DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 and FIG. 2 schematically illustrate a structure of a conventional lighting device.

FIG. 3 illustrates the subject matter of a lighting device according to the present invention.

FIG. 4 illustrates a structure in which beads are added to the lighting device of the present invention as illustrated in FIG. 3.

FIG. 5 and FIG. 6 illustrate a structure in which a reflection member is added to the lighting device of the present invention as illustrated in FIG. 3 and FIG. 4, respectively.

FIG. 7 and FIG. 8 illustrate a structure in which an optical sheet is added to the lighting device of the present invention as illustrated in FIG. 5 and FIG. 6, respectively.

FIG. 9 and FIG. 10 illustrate a structure in which an adhesive layer sheet is added to the lighting device of the present invention as illustrated in FIG. 7 and FIG. 8, respectively.

MODE FOR THE INVENTION

Exemplary embodiments according to the present invention will now be described more fully hereinafter with reference to the accompanying drawings so that those having ordinary skill in the art can easily embody. This invention may, however, be embodied in different forms and should not be construed as limited to the exemplary embodiments set forth herein. It is to be understood that the form of the present invention shown and described herein is to be taken as a preferred embodiment of the present invention and that various changes and modifications may be made in the invention without departing from the spirit and scope thereof. Also, in the following description, it is to be noted that, when the functions of conventional elements and the detailed description of elements related with the present invention may make the gist of the present invention unclear, a detailed description of those elements will be omitted. Reference will now be made in greater detail to a preferred embodiment of the invention, an example of which is illustrated in the accompanying drawings. Wherever possible, the same reference numerals will be used throughout the drawings and the description to refer to the same or like parts.

The present invention relates to a lighting device using LEDs, which are light emitting units, as a light source. The gist of the present invention is to provide a structure of a lighting device, which can improve aesthetic sensibility and can innovatively reduce an entire thickness of the lighting device by removing a light guide plate and replacing it with a resin layer and further forming a protruding optical pattern in an inner part of the lighting device so that emitted light can form various patterns, and can also secure flexibility and reduce the number of light sources.

Moreover, the lighting device according to the present invention can be applied to various lamp devices such as a lamp for vehicles, a lighting device for home use and a lighting device for industrial purpose, which require illumination. For example, in a case where the lighting device is applied to the lamp for vehicles, it can be also applied to headlights, car indoor illumination, door scuff, backlight and the like. Additionally, the lighting device according to the present invention can be applied to the field of a backlight unit applied to a liquid crystal display device. In addition to this, the lighting device can be applied to illumination related all fields which have been developed and commercialized or can be implemented according to future technical development.

FIG. 3 illustrates the subject matter of a lighting device according to the present invention.

Referring to FIG. 3, a lighting device 100a according to the present invention may include: a printed circuit board 110; one or more light emitting units 130 formed on the printed circuit board 110; and a resin layer 150 which is formed on the light emitting units 130 so that the light emitting units 130 is embedded in the resin layer, and guides emitted light forward. Furthermore, the lighting device may further include a diffusion plate 290 which uniformly diffuses the light incident from the resin layer 150 and emits the light to the outside. Also, a prism sheet and a protective sheet may be further provided in an upper part or a lower part of the diffusion plate 290, even though this is not illustrated in the drawing.

The printed circuit board 110 means a board in which a circuit pattern is formed on a substrate, namely, a PCB. In particular, in the present invention, it would be preferable that the printed circuit board is formed as a flexible printed circuit board (FPCB) to secure uniform flexibility.

The light emitting units 130 are configured such that one or more light emitting units are arranged on the printed circuit board 110, thereby emitting light. The light emitting units 130 of the present invention may be composed of side view type light emitting diodes. That is, a light emitting diode having a structure in which emitted light is emitted in a lateral direction rather than going straight up may be used as the light emitting units 130 of the present invention. Thus, in the lighting device 100a according to the present invention, the light emitting units 130 composed of the side view type light emitting diodes are disposed in a direct type, and the resin layer which functions to diffuse and reflect light is utilized so that the light is diffused and guided in a direction of the diffusion member 290, thereby reducing the number of light emitting units and innovatively reducing an entire weight and thickness of the lighting device.

The resin layer 150 is formed in an upper part of the light emitting units 130 and the printed circuit board 110. The resin layer 150 diffuses and guides the light emitted from the light emitting units 130 forward. That is, the resin layer 150 is formed in a structure in which the light emitting units are embedded, thereby functioning to diffuse the light emitted from the light emitting units 130 in a lateral direction. That is, the resin layer 150 may perform the function of a conventional light guide plate.

The resin layer 150 of the present invention may be basically composed of a material which can diffuse light. For example, the resin layer 150 of the present invention may be composed of an ultraviolet curing resin including an oligomer. More specifically, the resin layer 150 may be formed using resin which has a urethane acrylate oligomer as a main raw material. For example, a resin in which the urethane acrylate oligomer which is a synthetic oligomer is mixed with a polymer type which is polyacryl may be used. Of course, a monomer in which IBOA (isobornyl acrylate), HPA (Hydroxylpropyl acrylate, 2-HEA (2-hydroxyethyl acrylate), which are low boiling point and diluted type reactive monomers, are mixed may be further included. A photo initiator (e.g. 1-hydroxycyclohexyl phenyl-ketone and the like) or an antioxidant may be mixed as an additive. However, the aforesaid contents are only one example. In addition to this, the resin layer 150 of the present invention may be formed of all resins which have been developed and commercialized or can be embodied according to future technical development, and can perform the function to diffuse light.

According to the present invention, thanks to the existence of the resin layer 150, the thickness occupied by the conventional light guide plate can be innovatively reduced, and the entire product can be made thinner. Also, because the lighting device has flexibility, it may be easily applied to a curved surface and a degree of freedom in product design may be improved. Furthermore, the lighting device may be applied to other flexible display devices.

The diffusion member 290 is formed in the upper part of the resin layer 150 and functions to uniformly diffuse the light emitted through the resin layer 150 all over the surface. The diffusion member 290 may be generally formed of acryl resin. However, the material is not limited to this. In addition to the acryl resin, the diffusion member 290 may be formed of all materials of high transmission plastic such as polystyrene (PS), poly(methyl methacrylate) (PMMA), cyclic olefin copolymers (COC), polyethylene terephthalate (PET) and resin, which can perform a diffusion function.

Meanwhile, as illustrated in the drawing, a protruding optical pattern P1 may be formed in a lower part of the diffusion member 290. The protruding optical pattern P1 means a structure in which a protruding pattern is uniformly or non-uniformly disposed, and functions to reflect and diffuse incident light so that the light emitted to the outside forms a geometric pattern. The protruding optical pattern P1 may have a structure in which a plurality of patterns are provided and may be formed in a prism shape, a lenticular shape, a concave lens shape, a convex lens shape or a combination shape thereof to improve light reflection and diffusion effects. However, the shape is not limited to this. Also, a cross-sectional shape of the protruding optical pattern P1 may be formed in a structure having various shapes such as a triangular shape, a quadrangular shape, a semicircular shape, a sinusoidal shape and the like. Furthermore, the protruding optical pattern P1 may have a structure in which a size or a dense level of each pattern is changed according to a distance from the light emitting units 130. The protruding optical pattern P1 of the present invention may be formed by directly processing the diffusion member 290, but the method being not limited to this. The protruding optical pattern P1 may be formed by a method of adhering a film in which regular patterns are formed to the diffusion member 290 and all methods which have been developed and commercialized or can be implemented according to future technical development.

Meanwhile, the protruding optical pattern may be formed in an upper part of the printed circuit board 110 as well as on a lower surface of the diffusion member 290 or may be formed only on an upper surface of the printed circuit board, even though this is not illustrated in the drawings. In this case, the protruding optical pattern may be formed in such a manner that the film in which regular patterns are formed is adhered onto the upper surface of the printed circuit board 110.

An air layer (i.e. a first spacing part 280) may be further formed between the diffusion member 290 and the resin layer 150. Thanks to the existence of the first spacing part 280, the uniformity of light supplied to the diffusion member 290 may be increased. As a result, the uniformity of light diffused and emitted through the diffusion member 290 can be improved, and uniform surface light-emitting can be realized. Meanwhile, to minimize the deviation of light which transmits the resin layer 150, a thickness H1 of the first spacing part 280 may be formed in a range of 0 to 20 mm. However, the thickness is not limited to this. The thickness may be appropriately changed as necessary.

FIG. 4 illustrates a structure in which beads are added to the lighting device of the present invention as illustrated in FIG. 3.

Referring to FIG. 3 and FIG. 4, the resin layer 150 of the present invention may further include a plurality of beads 151 in a shape in which the beads having a hollow (or an air-void) formed in an inner part thereof are mixed and diffused. The beads 151 function to improve light reflection and diffusion properties. For example, when light emitted from the light emitting units 130 is incident to the beads 151 of an inner part of the resin layer 151, the light is reflected and transmitted by the hollow of the beads 151, and thus is diffused and concentrated. The light is then emitted to the diffusion member 290. At this time, a reflection and diffusion rate of the light are increased by the beads 151, so that an amount and uniformity of the emitted light supplied to the diffusion member 290 later are improved. As a result, luminance of the lighting device can be improved.

A content of the beads 151 may be appropriately adjusted to obtain a desired light diffusion effect. More specifically, the content of the beads may be adjusted in a range of 0.01 to 0.3 wt. % to a total weight of the resin layer. However, the content is not limited to this. That is, the light emitted from the light emitting unit 130 in a lateral direction is diffused and reflected through the resin layer 150 and the beads 151 so as to travel in an upper direction. The beads 151 may be formed of any one selected from silicon, silica, glass bubble, PMMA, urethane, Zn, Zr, $Al_2O_3$, and acryl. A diameter of the beads 151 may be formed in a range of 1 μm to 20 μm. However, the diameter is not limited to this.

FIG. 5 and FIG. 6 illustrate a structure 100c, 100d in which a reflection member is added to the lighting device of the present invention as illustrated in FIG. 3 and FIG. 4, respectively.

Referring to FIG. 3 to FIG. 6, a reflection member 120 of the present invention is formed on an upper surface of the printed circuit board 110 and has a structure in which the light emitting units 130 are formed to pass through the reflection member 120. The reflection member 120 according to the present invention is formed of a material having high reflection efficiency, thereby enabling light loss to be reduced by reflecting the light emitted from the light emitted units 130 to the upper part where the diffusion member 290 is located. The reflection member 120 may be formed in a film shape and may include a synthetic resin in which a white pigment is diffused and contained so that light reflection and diffusion properties can be realized. For example, titanium oxide, aluminum oxide, zinc oxide, lead carbonate, barium sulfate, calcium carbonate and the like may be used as the white pigment. Polyethylene terephthalate, polyethylene naphtaenate, acryl resin, poly carbonate, polystyrene, polyolefin, cellulose acetate, weather resistant vinyl chloride and the like may be used as the synthetic resin. However, the present invention is not limited to this.

Meanwhile, as illustrated in the drawing, a protruding optical pattern P2 may be formed on a surface of the reflection member 120. That is, the protruding optical pattern may be formed on any one of a lower surface of the diffusion member 290 and an upper surface of the reflection member 120 or both surfaces thereof. In particular, in a case where the protruding optical patterns are formed on both elements, a shape and disposition of the protruding optical patterns P1, P2 are appropriately adjusted so that the patterns of light emitted to the outside of the lighting device can be more variously formed. The explanation on the protruding optical patterns except for this is identical with that as described in the explanation of FIG. 3, thereby being omitted.

The reflection pattern 121 may be formed on a surface of the reflection member 120. The reflection pattern 121 functions to uniformly transmit light to the diffusion plate 290 by scattering and diffusing the incident light. The reflection pattern 121 may be formed in such a manner that the reflection pattern 121 is printed on a surface of the reflection member 120 using a reflective ink including any one of $TiO_2$, $CaCO_3$, $BaSO_4$, $Al_2O_3$, Silicon and PS. However, the present invention is not limited to this.

FIG. 7 and FIG. 8 illustrate a structure 100e, 100f in which an optical sheet is added to the lighting device of the present invention as illustrated in FIG. 5 and FIG. 6, respectively.

Referring FIG. 3 to FIG. 8, the lighting device 100e, 100f of the present invention may further include: a first optical sheet 170 formed on the upper surface of the resin layer 150; and a second optical sheet 190 formed on the first optical sheet 170. Also, an optical pattern 183 may be further formed on an upper surface of the first optical sheet 170 or a lower surface of the second optical sheet 190. One or more optical sheets may be additionally formed on the second optical sheet 190.

Meanwhile, as illustrated in the drawing, a protruding optical pattern P3 may be further formed on the second optical sheet 190. Thus, the protruding optical pattern may be formed on three elements and the geometric optical patterns may be more easily implemented by a combination of each pattern. Meanwhile, in the drawing, it is illustrated that the protruding optical pattern is formed on an upper surface of the second optical sheet 190. However, this is only one example. The protruding optical pattern may be formed on a lower surface of the second optical sheet 190. Moreover, the protruding optical pattern may be formed on the first optical sheet 170. The explanation on the protruding optical pattern except for this is identical with that as described in the explanation of FIG. 3, thereby being omitted.

The optical pattern 183 formed on the upper surface of the first optical sheet 170 or the lower surface of the second optical sheet 190 may be composed of as a light shielding pattern formed to prevent the concentration of light emitted from the light emitting units 130. For this, it is required to align between the optical pattern 183 and the light emitting units 130. At this time, to secure fixing strength after performing the aligning, the first optical sheet 170 and the second optical sheet 190 are adhered to each other using an adhesive layer which will be explained hereinafter.

The first optical sheet 170 and the second optical sheet 190 may be formed using a material having excellent light transmission. As one example, PET may be used.

The optical pattern 183 disposed between the first optical sheet 170 and the second optical sheet 190 basically functions to prevent the concentration of light emitted from the light emitting unit 130. The optical pattern 183 may be formed as a light shielding pattern so that a light shielding effect can be realized in a predetermined part to prevent a phenomenon in which an optical property is deteriorated or yellowish light is generated due to excessively strong light strength. The light shielding pattern may be formed by performing a printing process to the upper surface of the first optical sheet 170 and the lower surface of the second optical sheet 190 using a light shielding ink.

The optical pattern 183 may be realized as one optical pattern so as to perform the function to partially shield and diffuse light rather than the function to completely shield the light and adjust a light shielding and diffusing degree. Furthermore, more specifically, the optical pattern 183 according to the present invention may be realized in an overlapping print structure of complex patterns. The overlapping print structure means a structure which is implemented by forming one pattern and printing another pattern shape on an upper part thereof.

As one example, the optical pattern 183 may be implemented in a structure in which the diffusion pattern formed on a lower surface of a polymer film in a light emitting direction using a light shielding ink including one or more materials selected from $TiO_2$, $CaCO_3$, $BaSO_4$, $Al_2O_3$ and Silicon overlaps with the light shielding pattern formed using a light shielding ink including Al or a mixture of Al and $TiO_2$. That is, the diffusion pattern is formed on the surface of the polymer film by performing a white printing process, and thereafter, the light shield pattern is formed thereon. In reverse, the patterns may be formed in a double structure. Of course, it would be obvious that the formation design of the patterns may be variously changed in consideration of the efficiency and strength of light and a shading ratio. Also, the patterns may be formed in such a tripe structure that in a sequential laminated structure, the light shielding pattern, which is a metal pattern, is formed in a middle layer, and diffusion patterns are implemented, respectively in an upper part and a lower part thereof. In this triple structure, the patterns may be implemented by selecting the aforesaid materials. As one preferred example, based on the triple structure in which one diffusion pattern of diffusion patterns is implemented using $TiO_2$ having excellent reflectance, another diffusion pattern is implemented using $CaCO_3$ and $TiO_2$ together having excellent safety and color sense, and the light shielding pattern is implemented using Al having excellent hiding power, the efficiency and uniformity of light can be secured. In particular, $CaCO_3$ functions to decrease the exposure of yellowish light, and thus functions to finally implement white light, so that the more stable efficiency of light can be implemented. In addition to $CaCO_3$, inorganic materials having a large particle size and a similar structure such as $BaSO_4$, $Al_2O_3$ and silicon beads and the like may be utilized. Moreover, in view of the efficiency of light, it would be preferable that the optical pattern 183 is formed by adjusting a pattern density in such a manner that the pattern density is reduced as the optical pattern is moved far from the light emitting direction of the LED light source.

FIG. 9 and FIG. 10 illustrate a structure 100g, 100h in which an adhesive layer sheet is added to the lighting device of the present invention as illustrated in FIG. 7 and FIG. 8, respectively.

Referring to FIG. 3 to FIG. 10, the lighting device 100g, 100h of the present invention may further include an adhesive layer 180 formed between the first optical sheet 170 and the second optical sheet 190. A second spacing part 181 may be further formed on the adhesive layer 180. That is, the adhesive layer 180 forms a spaced space (the second spacing part 181) around the optical pattern 183. By applying an adhesive material to remaining parts, the adhesive layer 180 may be implemented in a structure in which the first optical sheet 170 and the second optical sheet 190 are adhered to each other. Also, one or more optical sheets may be additionally formed on the second optical sheet 190. The structure including the first optical sheet 170, the second optical sheet 190, the adhesive layer 180 and the optical pattern 183 may be defined as an optical pattern layer A.

The adhesive layer 180 may formed in a structure which the adhesive layer surrounds around the optical pattern 183, and the second spacing part 181 is formed in the remaining parts or a structure in which the second spacing part 181 is formed around the optical pattern 183. Thus, it may be realized to align it by bonding the two optical sheets to each other. That is, a bonding structure of the first optical sheet 170 and the second optical sheet 190 may function to fix the printed optical pattern 183.

At this time, the adhesive layer 180 may be formed using a thermosetting PSA, a thermosetting adhesive, UV curing PSA type materials. However, the material is not limited to this.

At this time, the first spacing part 280 as set forth in the explanation of FIG. 3 may be formed between the second optical sheet 190 and the diffusion member 290. Thanks to the existence of the first spacing part 280, the uniformity of light supplied to the diffusion member 290 may increase. As a result, the uniformity of light which is diffused and emitted through the diffusion member 290 may be improved. At this time, to minimize the deviation of light which transmits the resin layer 150, a thickness H1 of the first spacing part 280 may be formed in a range of exceeding 0 but not exceeding 20 mm. However, the thickness is not limited to this. As described in the explanation of FIG. 3, the thickness may be appropriately designed and changed as needed.

Also, as described above, one or more optical sheets may be additionally formed on the optical pattern layer (A) as necessary, even though this is not illustrated.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. A lighting device, comprising:
    at least one light emitting unit provided over a printed circuit board;
    a resin layer disposed over the light emitting unit and surrounding the light emitting unit;
    a diffusion member disposed on the resin layer; and
    an optical pattern layer disposed between the resin and the diffusion member,
    wherein the optical pattern layer includes a first optical sheet disposed on an upper surface of the resin layer and a second optical sheet disposed on the first optical sheet,
    wherein the diffusion member includes a surface facing the second optical sheet, wherein the surface of the diffusion member includes first patterned protrusions, and
    wherein the second optical sheet includes a surface facing the diffusion member, wherein the surface of the second optical sheet includes second patterned protrusions,
    wherein the first patterned protrusions are arranged in a first direction on the surface of the diffusion member, and the first patterned protrusions are vertically overlapped with the light emitting unit,
    wherein the second patterned protrusions are arranged in the first direction on the surface of the second optical sheet, and the second patterned protrusions are vertically overlapped with the light emitting unit, and
    wherein a spacing part is disposed between the first patterned protrusions and the second patterned protrusions.

2. The lighting device of claim 1, further comprising a reflection member provided between the printed circuit board and the resin layer, wherein the reflection member includes third patterned protrusions, and a reflection pattern is disposed between the reflection member and the resin layer.

3. The lighting device of claim 1, wherein the light emitting unit comprises side view type light emitting diodes.

4. The lighting device of claim 1, further comprising an adhesive layer disposed between the first optical sheet and the second optical sheet.

5. The lighting device of claim 1, wherein an optical pattern for shielding and reflecting emitted light is disposed on an upper surface of the first optical sheet or a lower surface of the second optical sheet.

6. The lighting device of claim 5, wherein the optical pattern is disposed in a structure in which a diffusion pattern including one or more materials selected from $TiO_2$, $CaCO_3$, $BaSO_4$, $Al_2O_3$ and silicon overlaps with a light shielding pattern including Al or a mixture of Al and $TiO_2$.

7. The lighting device of claim 6, wherein the diffusion pattern is disposed in a structure in which the diffusion pattern is printed on the light shielding pattern.

8. The lighting device of claim 1, wherein the resin layer is composed of an ultraviolet curing resin including an oligomer, wherein the oligomer comprises any one material selected from urethane acrylate, epoxy acrylate, polyester acrylate and acrylic acrylate.

9. The lighting device of claim 1, wherein the printed circuit board comprises a flexible printed circuit board.

10. The lighting device of claim 1, wherein the first patterned protrusions are disposed in the first direction on the entire surface of the diffusion member, and the second patterned protrusions are disposed in the first direction on the entire surface of the second optical sheet.

11. The lighting device of claim 1, wherein the first patterned protrusions extend in the first direction from a first edge of the surface of the diffusion member to a second edge of the surface of the diffusion member.

12. A lighting device comprising:
at least one light emitting device;
a resin layer on the light emitting device;
a diffusion member on the resin layer;
a first optical sheet on an upper surface of the resin layer; and
a second optical sheet on the first optical sheet,
wherein the diffusion member includes first patterned protrusions to face the second optical sheet, and
wherein the second optical sheet includes second patterned protrusions to face the diffusion member,
wherein the first patterned protrusions are arranged in a first direction on the surface of the diffusion member, and the first patterned protrusions are vertically overlapped with the light emitting device,
wherein the second patterned protrusions are arranged in the first direction on the surface of the second optical sheet, and the second patterned protrusions are vertically overlapped with the light emitting device, and
wherein a spacing part is disposed between the first patterned protrusions and the second patterned protrusions.

13. The lighting device of claim 12, comprising:
a circuit board, wherein the at least one light emitting device is on the circuit board;
a reflection member between the circuit board and the resin layer, wherein the reflection member includes third patterned protrusions, and
a reflection pattern between the reflection member and the resin layer.

14. The lighting device of claim 12, wherein the light emitting device includes side view type light emitting diodes.

15. The lighting device of claim 12, comprising an adhesive layer between the first optical sheet and the second optical sheet.

16. The lighting device of claim 12, wherein the first patterned protrusions are disposed in the first direction on the entire surface of the diffusion member, and the second patterned protrusions are disposed in the first direction on the entire surface of the second optical sheet.

17. The lighting device of claim 12, wherein the first patterned protrusions extend in the first direction from a first edge of the surface of the diffusion member to a second edge of the surface of the diffusion member.

* * * * *